(12) United States Patent
Stapleton

(10) Patent No.: US 11,548,252 B2
(45) Date of Patent: Jan. 10, 2023

(54) OUTER SPACE WASTE COMPACTION

(71) Applicant: HAMILTON SUNDSTRAND CORPORATION, Charlotte, NC (US)

(72) Inventor: Thomas J. Stapleton, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 838 days.

(21) Appl. No.: 15/618,581

(22) Filed: Jun. 9, 2017

(65) Prior Publication Data
US 2018/0354218 A1    Dec. 13, 2018

(51) Int. Cl.
*B30B 9/04* (2006.01)
*B30B 15/34* (2006.01)
(Continued)

(52) U.S. Cl.
CPC .............. *B30B 9/04* (2013.01); *B30B 9/305* (2013.01); *B30B 9/3039* (2013.01);
(Continued)

(58) Field of Classification Search
CPC ..... B30B 9/305; B30B 9/3039; B30B 9/3057; B30B 15/0052; B30B 15/168; B30B 15/34; B30B 9/04; B30B 9/06; B30B 9/3021; B30B 9/3032; B30B 1/32; B30B 9/3003; B30B 9/301; B30B 9/3042; B30B 9/3096; B30B 1/003; B30B 1/36; B30B 1/38;
(Continued)

(56) References Cited

U.S. PATENT DOCUMENTS 4,086,378 A * 4/1978 Kam ................. B64C 1/068
                                                    428/34.5
4,273,037 A * 6/1981 Ruebesam ........... B30B 9/3003
                                                    100/229 A
(Continued)

FOREIGN PATENT DOCUMENTS

CN       106365401       2/2017
DE        4320860        1/1994
(Continued)

OTHER PUBLICATIONS

NASA, The Space Station Integrated Refuse Management System, 1998, p. xi, 8, 158-161 (Year: 1988).*
(Continued)

*Primary Examiner* — Bobby Ramdhanie
*Assistant Examiner* — Donovan Bui-Huynh
(74) *Attorney, Agent, or Firm* — Snell & Wilmer L.L.P.

(57) ABSTRACT

A waste compaction apparatus may include a housing and a connector arm. The housing may define a drive chamber and a compaction chamber and the connector arm may include a drive piston portion movably positioned within the drive chamber and a compaction piston portion movably positioned within the compaction chamber. The drive chamber may be selectively fluidly coupleable to the near-vacuum of outer space, such that the compaction piston portion of the connector arm is configured to move within the compaction chamber to compact waste material contained within the compaction chamber in response to movement of the drive piston portion of the connector arm within the drive chamber.

14 Claims, 4 Drawing Sheets

(51) Int. Cl.
  *B30B 15/00*  (2006.01)
  *B30B 15/16*  (2006.01)
  *B64G 1/22*   (2006.01)
  *B30B 9/30*   (2006.01)
  *B64G 1/60*   (2006.01)

(52) U.S. Cl.
  CPC ........ *B30B 9/3057* (2013.01); *B30B 15/0052* (2013.01); *B30B 15/168* (2013.01); *B30B 15/34* (2013.01); *B64G 1/22* (2013.01); *B64G 1/60* (2013.01)

(58) Field of Classification Search
  CPC ....... B30B 7/04; B30B 9/3014; B30B 9/3028; B30B 9/3064; B30B 9/3078; B30B 9/3085; B64G 1/60; B64G 1/22; B64G 1/66; A47K 11/02; A47K 11/023; B01D 19/0005; B01D 19/0031; B01D 61/00; B01D 61/36; B64D 11/04; G01N 1/2214; G01N 2001/2267; G01N 2001/4066; G01N 2035/00336; G01N 33/18; Y02A 50/30; Y02A 50/454; B65F 1/1405; B65F 1/105; B65F 2210/116; B65F 3/143; B65F 3/201; B65F 5/005; F23G 2202/30; F23G 2203/60; F23G 2900/7003; F23G 5/0276; F26B 3/18; F26B 5/12; F26B 7/00; F26B 9/06; F26B 3/20; F26B 3/347; F26B 5/04; B29C 70/22; B29D 22/00; B29K 2105/06; B64C 1/068; B64C 1/08; B65B 27/12; E04C 2/32; Y10S 100/915; Y10S 220/908
  See application file for complete search history.

(56) References Cited

U.S. PATENT DOCUMENTS

| | | | |
|---|---|---|---|
| 4,444,099 A | | 4/1984 | Paleschuck |
| 4,917,712 A | * | 4/1990 | Crigler ................... B01D 46/02 55/432 |
| 5,005,457 A | * | 4/1991 | Thornton, Jr. ......... A47K 11/02 83/206 |
| 5,104,810 A | * | 4/1992 | Birbara ............. B01D 19/0005 422/89 |
| 6,106,270 A | * | 8/2000 | Hardin ................... B30B 9/305 425/412 |
| 9,486,774 B2 | | 11/2016 | Verma et al. |
| 2002/0185016 A1 | * | 12/2002 | Hoffjann ................ B30B 9/305 100/110 |
| 2008/0098909 A1 | | 5/2008 | Willamor |
| 2011/0259210 A1 | * | 10/2011 | Reed ........................ B30B 9/26 100/37 |
| 2016/0115405 A1 | | 4/2016 | Zubrin et al. |
| 2016/0153351 A1 | * | 6/2016 | Turner ................... F02B 37/16 60/600 |

FOREIGN PATENT DOCUMENTS

| | | |
|---|---|---|
| FR | 920874 | 4/1947 |
| JP | H01153398 | 6/1989 |
| JP | H10175098 | 6/1998 |

OTHER PUBLICATIONS

AGI, How Does Pneumatic Air Cylinder Actuators Work?, Feb. 2, 2011, p. 1 (Year: 2011).*
European Patent Office, European Search Report dated Nov. 30, 2018 in Application No. 18176084.4.

* cited by examiner

OUTER SPACE WASTE COMPACTION

FIELD

The present disclosure relates to compacting systems, and more specifically, to utilizing the near-vacuum of outer space to compact and process waste material.

BACKGROUND

Motorized actuation systems and devices used aboard spacecraft are often the result of extensive, timely, and costly development. For example, developing a motorized actuation device for a specific application onboard a spacecraft, including its associated controller, involves a substantial time and capital investment. Additionally, such devices are often heavy, thus adding weight to the spacecraft.

Additionally, conventional Waste Collector Systems (WCS) aboard, for example, the Space Shuttle and International Space Station (ISS), utilize air flow to entrain human waste. For example, fecal material is typically collected by air flow entrainment. For instance, air may enter in a fairly uniform radial direction under a seat of the WCS. Air drag then helps separate the fecal bolus and draw it into a tank or fecal collection bag. The collected feces are generally thrown overboard. Because a substantial portion of fecal matter is comprised of water, disposing of collected fecal matter in this manner results in a loss of water, a valuable resource for space travel, from the spacecraft.

SUMMARY

In various embodiments, the present disclosure provides a waste compaction apparatus that includes a housing and a connector arm. The housing may define a drive chamber and a compaction chamber. The connector arm may include a drive piston portion movably positioned within the drive chamber and a compaction piston portion movably positioned within the compaction chamber. The drive chamber is selectively fluidly coupleable to the near-vacuum of outer space, according to various embodiments, and the compaction piston portion of the connector arm is configured to move within the compaction chamber to compact waste material contained within the compaction chamber in response to movement of the drive piston portion of the connector arm within the drive chamber, according to various embodiments.

In various embodiments, the compaction piston portion of the connector arm is configured to move within the compaction chamber in a first direction to compact the waste material contained within the compaction chamber in response to movement of the drive piston portion of the connector arm within the drive chamber in the first direction. In various embodiments, the drive chamber is an annular chamber that circumscribes the compaction chamber. In various embodiments, the waste compaction apparatus further includes a diverter valve coupled to the housing that is in fluidic communication with the drive chamber. The diverter valve is selectively operable to control a drive pressure in the drive chamber, according to various embodiments. In various embodiments, the diverter valve is selectively fluidly coupleable to a waste gas source.

The waste compaction apparatus may further include a heater coupled to the housing and configured to heat the waste material contained with the compaction chamber. The housing may include a fluid outlet from the compaction chamber. The connector arm may have a rigid body extending between the compaction piston portion and the drive piston portion.

Also disclosed herein, according to various embodiments, is a waste processing system that includes, a connector arm, a diverter valve, and a gas-liquid separator. The housing may define a drive chamber, a compaction chamber, and a fluid outlet from the compaction chamber. The connector arm may include a drive piston portion movably positioned within the drive chamber and a compaction piston portion movably positioned within the compaction chamber. The diverter valve may be coupled to the housing in fluidic communication with the drive chamber. The gas-liquid separator may be coupled to the housing in fluidic communication with the compaction chamber via the fluid outlet. In various embodiments, the drive chamber is selectively fluidly coupleable to the near-vacuum of outer space via the diverter valve and the compaction piston portion of the connector arm is configured to move within the compaction chamber to compact waste material contained within the compaction chamber in response to movement of the drive piston portion of the connector arm within the drive chamber. In various embodiments, in response to compacting the waste material contained within the compaction chamber, the compaction chamber is configured to expel a waste fluid via the fluid outlet to the gas-liquid separator. In various embodiments, the gas-liquid separator is configured to separate the waste fluid into waste liquid and waste gas.

In various embodiments, the waste processing system further includes a first conduit extending between the diverter valve and a first portion of the drive chamber, and a second conduit extending between the diverter valve an a second portion of the drive chamber. The first portion of the drive chamber may be at least partially defined by a first side of the drive piston portion, and the second portion of the drive chamber is at least partially defined by a second side of the drive piston portion opposite the first side. The waste processing system may further include a waste gas conduit configured to direct the waste gas from the gas-liquid separator. The waste gas conduit may be configured to direct the waste gas to outer space or to a waste gas holding tank. The waste gas holding tank is fluidly coupled to the diverter valve to provide back-fill gas to the drive chamber, according to various embodiments. The waste gas valve is configured to selectively direct the waste gas to at least one of outer space and a waste gas holding tank. The waste processing system may further include a heater coupled to the housing that is configured to heat the waste material contained with the compaction chamber.

Also disclosed herein, according to various embodiments, is a method for processing waste. The method includes exposing a drive chamber of a housing to the near-vacuum of outer space and compacting waste material within a compaction chamber of the housing. The waste material may be fecal matter, and the method may further include, in response to the compacting the fecal matter, separating waste fluid from the compaction chamber into a waste gas and a waste liquid via a gas-liquid separator. Still further, the method may include collecting the waste liquid for recycling.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
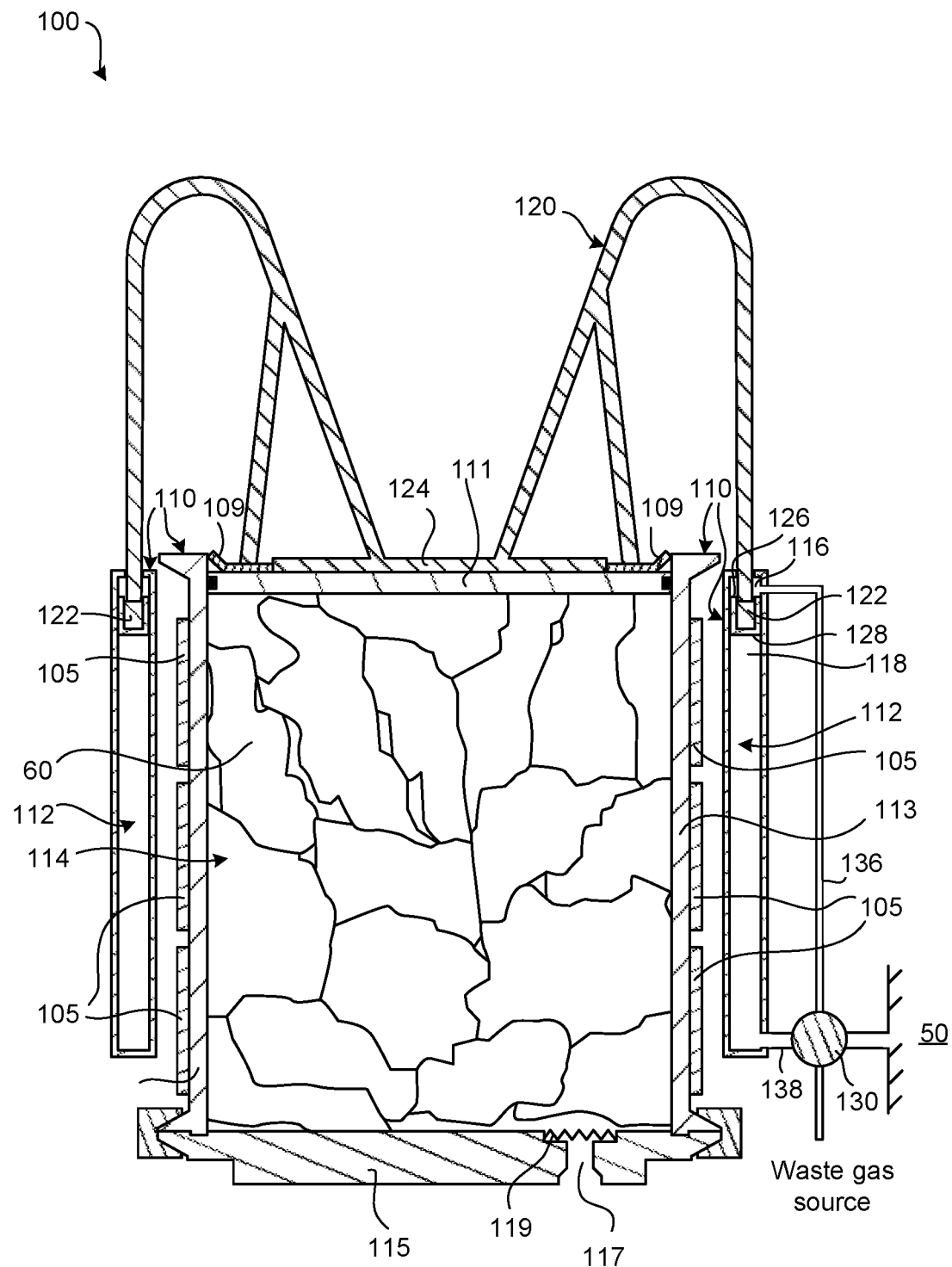
FIG. 1 illustrates a cross-sectional view of a waste compaction apparatus in a pre-compacted state, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, and with reference to FIG. 1, a waste compaction apparatus 100 is provided. The waste compaction apparatus 100, as described in greater detail below, generally takes advantage of the near-vacuum of outer space to compact waste material. In various embodiments, the waste compaction apparatus 100 may be used to compact fecal matter, trash, garbage, or other waste. In various embodiments, the waste compaction apparatus 100 is used to extract and recycle water from fecal matter. The waste compaction apparatus 100 may be utilized with a system, such as waste processing system 10 described below with reference to FIG. 3. While numerous details are included herein pertaining to using the waste compaction apparatus as a feces processing apparatus, the scope of the present disclosure is not limited to feces processing. The waste compaction apparatus 100 (with reference to FIGS. 1 and 2) and the waste processing system 10 (with reference to FIG. 3) may be implemented for use within the ISS, low earth orbit (LEO) aircraft, crew exploration vehicle (CEV), and/or a space hotel to compact and/or otherwise process waste material. Stated another way, the waste compaction apparatuses, systems, and methods disclosed herein may supplement, replace, and/or be utilized in conjunction with existing aerospace waste collector systems.

The waste compaction apparatus 100, according to various embodiments and with continued reference to FIG. 1, includes a housing 110 and a connector arm 120. The housing 110 defines a drive chamber 112 and a compaction chamber 114 and the connector arm includes a drive piston portion 122 movably positioned within the drive chamber 112 and a compaction piston portion 124 movably positioned within the compaction chamber 114, according to various embodiments. Generally, waste material 60, such as fecal matter, is placed into the compaction chamber 114 and the waste compaction apparatus 100 is configured to compact the waste material 60. The compacting force, according to various embodiments, is provided by the near-vacuum of outer space, as described in greater detail below, as opposed to utilizing a motorized compaction device. In various embodiments, the compaction of the waste material 60 reduces the volume of the waste onboard a spacecraft. In various embodiments, as described in greater detail below with reference to FIG. 3, the waste compaction apparatus 100 may be utilized to extract waste liquid (e.g., water) from fecal matter for collection/recycling. FIG. 1, according to various embodiments, illustrates the waste compaction apparatus 100 in a pre-compacted state and FIG. 2, according to various embodiments, illustrates the waste compaction apparatus 100 in a compacted state.

Figure 2:
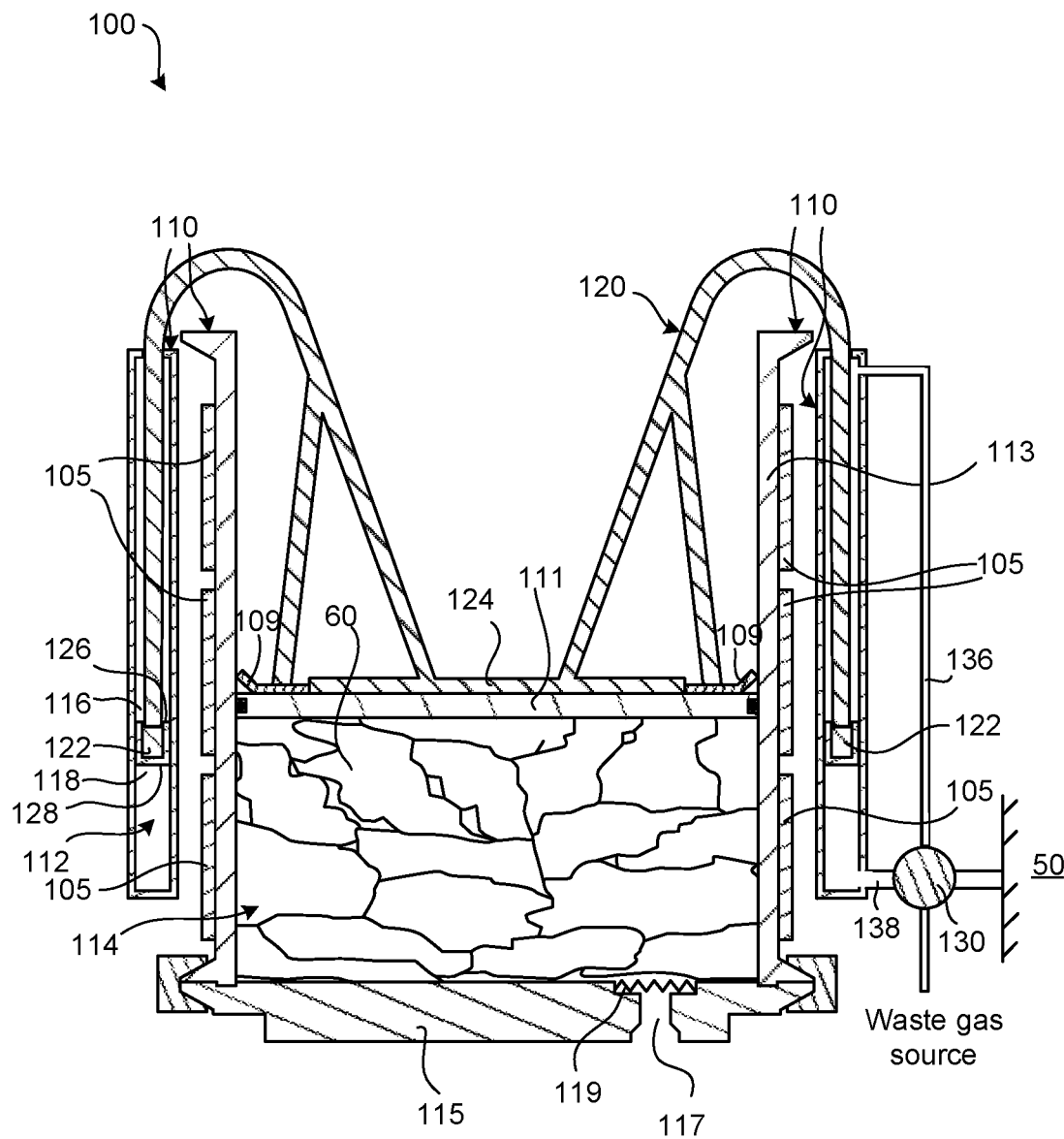
FIG. 2 illustrates a cross-sectional view of a waste compaction apparatus in a compacted state, in accordance with various embodiments.

In various embodiments, and with reference to FIGS. 1 and 2, the drive piston portion 122 is configured to move within the drive chamber 112, and the compaction piston portion 124 is configured to move within the compaction chamber 114. For example, the drive chamber 112 may be selectively fluidly coupleable to the near-vacuum of outer space, such that, in response to exposing at least a portion of the drive chamber 112 to the near-vacuum of outer space, said portion of the drive chamber 112 may be substantially evacuated, thereby creating a pressure differential across the drive piston portion 122, causing the drive piston portion 122 to move. For example, the pressure on one side of the drive piston portion 122 may be about 1 atmosphere (101.3 kilopascals) while the pressure on the other, evacuated side of the drive piston portion 122 may be less than about 1 micropascal. In response to this movement of the drive piston portion 122, the compaction piston portion 124 of the connector arm 120 may also move within the compaction chamber 114 to compact the waste material 60 contained within the compaction chamber 114. By compacting certain types of waste materials, such as fecal matter, waste fluid may be urged and extracted from the fecal matter in response to compaction and may exit through fluid outlet 117. This waste fluid, as described in greater detail below, may be further processed and refined in order to extract waste liquid (e.g., water) from the waste material 60.

In various embodiments, the waste compaction apparatus 100 may further include a heater 105 coupled to the housing 110 and configured to provide heat to the waste material 60. The heater 105 may be configured to elevate the temperature of the waste material 60, thereby facilitating extraction of waste fluid from the waste material 60 (e.g., water from fecal matter) and also helping to kill bacteria or other microbes/microorganisms present in the waste material 60. According to various embodiments, the heater 105 may raise the temperature of the waste material 60 to between about 50 degrees Celsius and about 250 degrees Celsius. In various embodiments, the heater 105 may raise the temperature of the waste material 60 to between about 100 degrees Celsius and about 200 degrees Celsius. As used in this context only, the term "about" refers to plus or minus 5% of the indicated value. Accordingly, the waste compaction apparatus 100 may be a torrefaction-type process that includes heating and compaction functionality.

In various embodiments, the heater 105 may be coupled to and/or disposed around side walls 113 of the portion of the housing 110 that defines the compaction chamber 114. In various embodiments, the housing 110 may include other walls, such as a moveable piston-like wall 111 and a base wall 115, that collectively define the compaction chamber 114. The moveable piston-like wall 111 may be coupled to, and/or may be in abutting engagement with, the compaction piston portion 124 of the connector arm 120. The housing 110 may also include other walls that define the drive chamber 112. In various embodiments, the housing 110 may be comprised of multiple portions or sections that respectively form and define the drive chamber 112 and the compaction chamber 114. For example, the housing 110 may comprise two separate housings, a first housing defining the drive chamber 112 and a second housing defining the compaction chamber 114, and the two housings may be rigidly fixed relative to each other (i.e., preventing relative movement between the two housings). However, in various embodiments the housing 110 may be integrally formed of a single piece of material.

In various embodiments, the compaction chamber 114 of the housing 110 is a central chamber, and the drive chamber 112 is an annular chamber formed around the compaction chamber 114 (i.e., the drive chamber 112 circumscribes the compaction chamber 114). Accordingly, the connector arm 120 may have an annular configuration, with the compaction piston portion 124 having a central plate configured to move within the compaction chamber 114, and the drive piston portion 122 having an annular ring configured to move within the annulus that is the drive chamber 112. In various embodiments, the housing 110 is cylindrical, and thus the defined chambers 112, 114 therein and the piston portions 122, 124 of the connector arm 120 may also be cylindrical.

In various embodiments, the connector arm 120 has a rigid body that extends between the drive piston portion 122 and the compaction piston portion 124. For example, the connector arm 120 may be integrally formed of a single, unitary material. The piston portions 122, 124 of the connector arm 120, according to various embodiments, are the fluid/waste facing surfaces that directly face and engage the respective contents of the chambers 112, 114. Thus, the piston portions 122, 124 may include sealing features that facilitate a fluid seal between the piston portions 122, 124 and the respective walls of the housing 110. In various embodiments, the piston portions 122, 124 engage other components, such as the moveable piston-like wall 111 of the housing 110, and said other components form a fluid seal with adjacent and respective walls of the housing 110. In various embodiments, an annular seal 109 may be utilized in conjunction with the moveable piston-like wall 111 and the compaction piston portion 124 of the connector arm 120. Said differently, the waste compaction apparatus 100 may include an annular seal 109 that is disposed radially outward of the compaction piston portion 124 of the connector arm 120, and the annular seal 109 may engage a radially inward surface of side walls 113 of the housing 110. The connector arm 120 may include a segment/section that directly couples to and/or abuts the annular seal 109.

In various embodiments, movement of the piston portions 122, 124 of the connector arm 120 are in the same direction. Said differently, the compaction piston portion 124 of the connector arm 120 may be configured to move within the compaction chamber 114 in a first direction to compact the waste material 60 in response to the driven movement (suction of the near-vacuum of outer space) of the drive piston portion 122 of the connector arm 120 within the drive chamber 112 in the first (e.g., same) direction. Similarly, the compaction piston portion 124 of the connector arm 120 may be configured to move within the compaction chamber 114 in a second direction opposite the first direction to retract the compaction piston portion 124 in response to retraction of the drive piston portion 122 of the connector arm 120 within the drive chamber 112 in the second direction.

As mentioned above, the process of compacting (and optionally heating) the waste material 60 facilitates the extraction of waste fluid from the waste matter 60 (e.g., water from fecal matter). The waste fluid may seep out of the waste material due, at least in part, to the compression forces exerted on the waste material 60 by the compaction piston portion 124 of the connector arm 120 and/or the waste fluid may boil out of the waste material due to the heating of the waste material 60. The waste compaction apparatus 100 may also include a solid/fluid separator 119 disposed in the fluid outlet 117 from the compaction chamber 114 that helps to retain the solid waste material 60 within the compaction chamber 114 during compaction. The extracted waste fluid, as described in greater detail below with reference to FIG. 3, may be further processed and refined in order to recycle/reuse at least the extracted water content.

The waste compaction apparatus 100 may further include a diverter valve 130 that is coupled to the housing 110. The diverter valve 130 may be in fluidic communication with the drive chamber 112. The diverter valve 130 may be selectively operable to control a drive pressure in the drive chamber 112. The drive pressure may be defined as the pressure differential across the drive piston portion 122. In various embodiments, the diverter valve 130 is fluidly coupled to outer space 50 (or any other near-vacuum) and may be selectively controlled to expose the drive chamber 112 to the near-vacuum pressure of outer space 50 in order to drive motion of the drive piston portion 122, which drives compaction of the waste material 60 via force transferred through the connector arm 120 to the compaction piston portion 124. The diverter valve 130 may also be selectively coupleable to a waste gas source, as described in greater detail below with reference to FIG. 3.

In various embodiments, and with continued reference to FIGS. 1 and 2, the waste compaction apparatus 100 may include a first conduit 136 and a second conduit 138. The first conduit 136 may extend between the diverter valve 130 and a first portion 116 of the drive chamber 112 and the second conduit 138 may extend between the diverter valve 130 and a second portion 118 of the drive chamber 112. The first and second portions 116, 118 of the drive chamber 112 may be disposed on opposite sides of the moveable drive piston portion 122 of the connector arm 120. Said differently, the first portion 116 of the drive chamber 112 is at least partially defined by a first side 126 of the drive piston portion 122 and the second portion 118 of the drive chamber 112 is at least partially defined by a second side 128 of the drive piston portion 122, wherein the first side 126 of the drive piston portion 122 is opposite the second side 128.

The diverter valve 130 may be selectively controlled and actuated to, for example, fluidly connect the near-vacuum of outer space 50 to the second conduit 138, thereby evacuating the second portion 118 of the drive chamber 112 and creating the aforementioned pressure differential across the drive piston portion 122, which causes the movement of the connector arm 120. The diverter valve 130 may be configured to direct back-flow of a gas, for example, a waste gas from a waste gas source, to the first portion 116 of the drive chamber 112 via the first conduit 136 during compaction. After a completed compaction step, the diverter valve 130 may be configured introduce a waste gas into the second portion 118 of the drive chamber 112 via the second conduit 138 to increase the pressure in the second portion 118 of the drive chamber 112, thereby decreasing (or eliminating or reversing) the pressure differential across the drive piston portion 122 to allow the compaction piston portion 124 of the connector arm 120 to be retracted from the compaction chamber 114. The spent/compacted waste material 60 may be disposed of or may be utilized for radiation shielding, among other uses, and a new batch of waste material 60 may be loaded into the compaction chamber 114.

Figure 3:
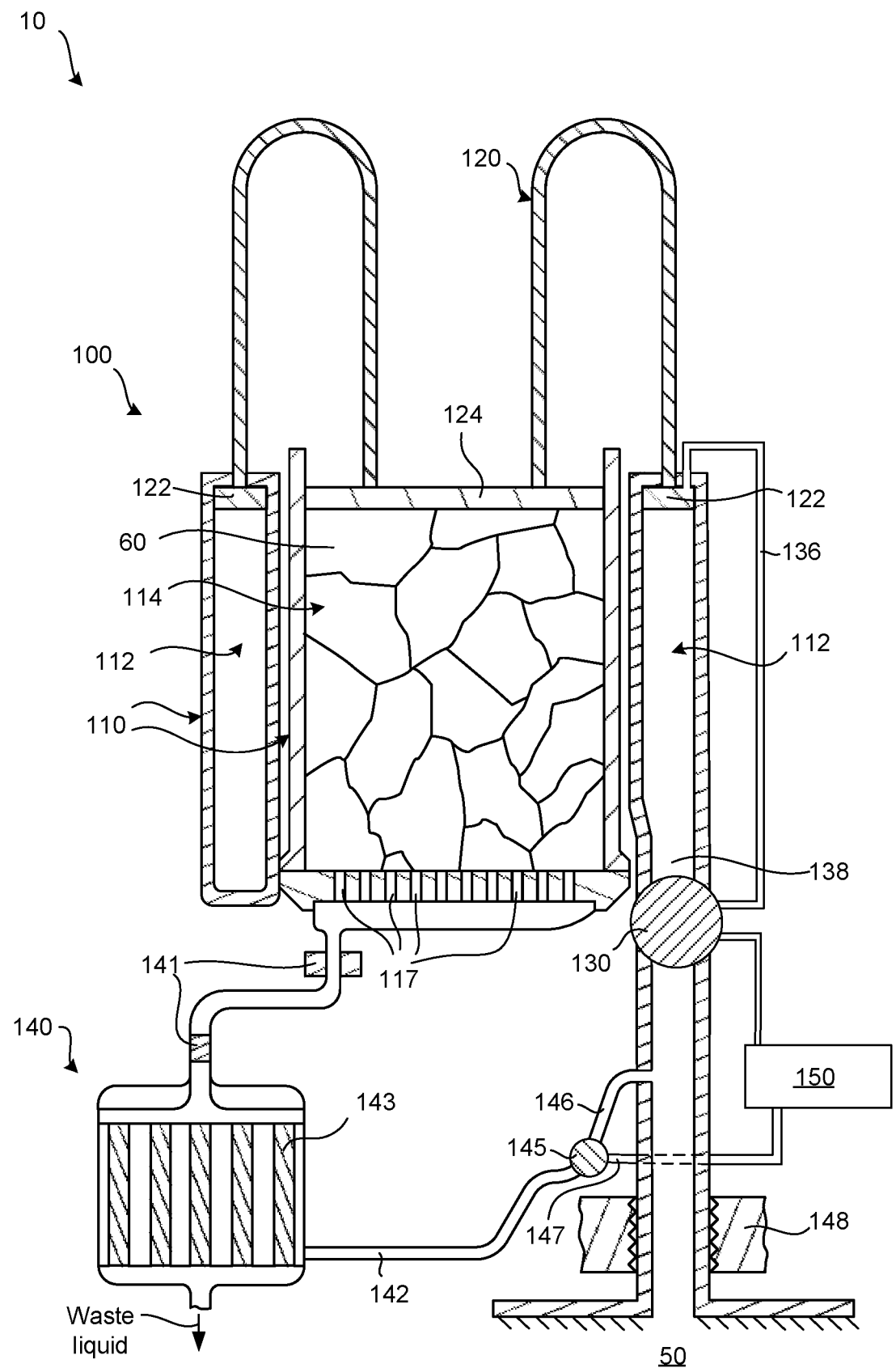
FIG. 3 illustrates a cross-sectional view of a waste processing system, with various components of the system schematically depicted, in accordance with various embodiments.

In various embodiments, and with reference to FIG. 3, a waste processing system 10 is provided. As mentioned above, the waste processing system 10 may include, in addition to the components of the waste compaction apparatus 100 described above, one or more additional refining/processing units that facilitate water recycling from the waste material 60. In various embodiments, the waste processing system 10 includes the housing 110, the connector arm 120, and the diverter valve 130 as described with reference to FIGS. 1 and 2. The waste processing system 10 may further comprise a gas-liquid separator 140 coupled to the housing 110. The gas-liquid separator 140 may be in fluidic communication with the compaction chamber 114 via one or more fluid outlets 117. One or more valves or filters 141 may be disposed along the conduit between the compaction chamber 114 and the gas-liquid separator 140. The gas-liquid separator 140 may include filters or membranes 143 that are configured to separate the waste fluid from the compaction chamber 114 into a waste liquid (e.g., water) and a waste gas. The waste liquid may be further refined, deodorized, etc., in order to render the waste liquid useable.

The waste processing system 10 may further include a waste gas conduit 142 in fluid communication with the gas-liquid separator 140 and a waste gas valve 145. The waste gas conduit 142 may be configured to direct the waste gas from the gas-liquid separator 140 to be dumped into outer space 50 or to be directed to a waste gas holding tank 150 (e.g. a waste gas source). For example, the waste processing system 10 may include the waste gas valve 145 that allows the waste gas to be selectively directed to either vent to outer space 50 via conduit 146 and/or flow to the waste gas holding tank 150. The waste gas holding tank 150 may be fluidly coupled to the diverter valve 130 and, as described above, the diverter valve 130 may be selectively controlled to utilize the waste gas to back-fill portions of the drive chamber 112 and/or to return the drive chamber 112 to a nominal pressure after compaction. In various embodiments, the waste processing system 10 may further include one or more heating units 148 that are configured to introduce heat into the system in order to prevent the low temperature of the near-vacuum environment of outer space from adversely affecting the components of the system 10.

Figure 4:
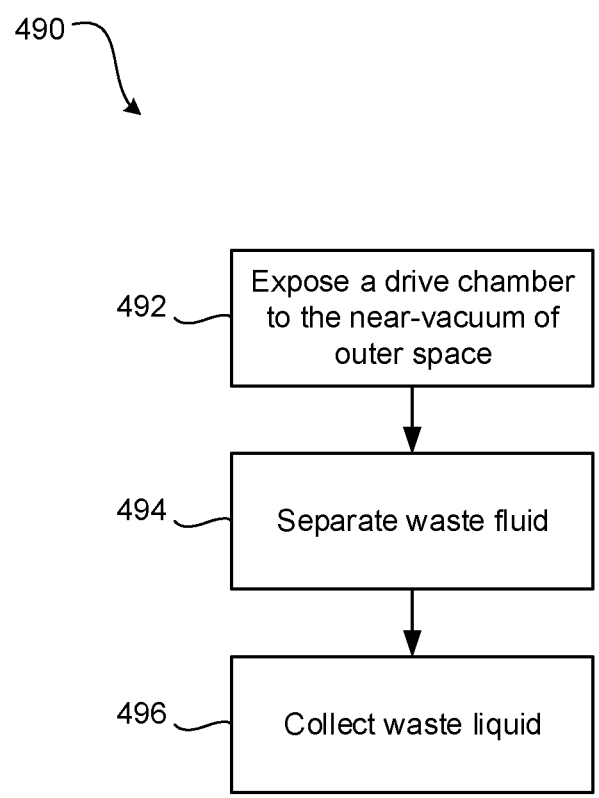
FIG. 4 is a schematic flowchart diagram of a method for processing waste, in accordance with various embodiments.

Also disclosed herein, according to various embodiments and with reference to FIG. 4, is a method 490 for processing waste. The method 490 may include exposing a drive chamber to the near-vacuum of outer space at step 492. The method 490 may further include separating waste fluid from waste material at step 494 and collecting waste liquid from the waste fluid at step 496. Once again, although numerous details and examples are included herein pertaining to the compaction of feces, those skilled in the art will recognize that the systems and methods disclosed herein may be utilized with other waste matter, such as trash or garbage.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
a housing defining a drive chamber, a compaction chamber, and a fluid outlet from the compaction chamber;
a connector arm comprising a drive piston portion movably positioned within the drive chamber and a compaction piston portion movably positioned within the compaction chamber;
a diverter valve coupled to the housing in fluidic communication with the drive chamber;
a first conduit extending between the diverter valve and a first portion of the drive chamber, wherein the first portion of the drive chamber is at least partially defined by a first side of the drive piston portion;
a second conduit extending between the diverter valve and a second portion of the drive chamber, the second portion of the drive chamber being defined, at least, partially a second side of the drive piston portion opposite the first side of the drive piston portion;
a waste gas source fluidly coupled to the diverter valve, and
a gas-liquid separator coupled to the housing in fluidic communication with the compaction chamber via the fluid outlet;
wherein:
the second portion of the drive chamber is selectively fluidly coupleable to the near-vacuum of outer space via the diverter valve, wherein during compaction the diverter valve fluidly couples the second portion of the drive chamber to the near-vacuum of outer space, and wherein after compaction the diverter valve directs gas from the waste gas source into the second portion of the drive chamber via the second conduit to retract the compaction piston portion of the connector arm;
the compaction piston portion of the connector arm is configured to move within the compaction chamber to compact waste material contained within the compaction chamber in response to movement of the drive piston portion of the connector arm within the drive chamber;
the connector arm comprises an annular configuration, with the compaction piston portion having a central plate;
in response to compacting the waste material contained within the compaction chamber, the compaction chamber is configured to expel a waste fluid via the fluid outlet to the gas-liquid separator; and
the gas-liquid separator is configured to separate the waste fluid into waste liquid and waste gas.

2. The system of claim 1, wherein the connector arm is a unitary material such that the drive piston portion and the compaction piston portion are integrally formed of a single material.

3. The system of claim 1, wherein the diverter valve is selectively operable to control a drive pressure in the drive chamber, and wherein during compaction the diverter valve directs gas from the waste gas source into the first portion of the drive chamber via the first conduit.

4. The system of claim 1, further comprising a waste gas conduit configured to receive the waste gas from the gas-liquid separator.

5. The system of claim 4, wherein the waste gas conduit is configured to direct the waste gas to outer space.

6. The system of claim 4, wherein the waste gas conduit is configured to direct the waste gas a waste gas holding tank.

7. The system of claim 6, wherein the waste gas source includes the waste gas holding tank.

8. The system of claim 4, further comprising a waste gas valve fluidly coupled to the waste gas conduit, wherein the waste gas valve is configured to actuate between a first position wherein the waste gas is directed to outer space and a second position wherein the waste gas is directed to the waste gas source.

9. The system of claim 1, further comprising a heater coupled to the housing and configured to heat the waste material contained with the compaction chamber.

10. The system of claim 1, wherein the housing comprises a moveable piston-like wall, wherein the compaction piston portion of the connector arm engages the moveable piston-like wall.

11. The system of claim 10, further comprising an annular seal located radially outward of the compaction piston portion, wherein the annular seal forms a fluid tight seal between the compaction piston portion and radially inward side walls of the housing facing the compaction chamber.

12. A system comprising:
a housing defining a drive chamber, a compaction chamber, and a fluid outlet from the compaction chamber;
a connector arm comprising a drive piston portion movably positioned within the drive chamber and a compaction piston portion movably positioned within the compaction chamber;
a diverter valve coupled to the housing in fluidic communication with the drive chamber;
a first conduit extending between the diverter valve and a first portion of the drive chamber, wherein the first portion of the drive chamber is at least partially defined by a first side of the drive piston portion;
a second conduit extending between the diverter valve and a second portion of the drive chamber, the second portion of the drive chamber being defined, at least, partially a second side of the drive piston portion opposite the first side of the drive piston portion;
a waste gas source fluidly coupled to the diverter valve, and
a gas-liquid separator in fluidic communication with the compaction chamber and downstream from the fluid outlet;
wherein:
the second portion of the drive chamber is selectively fluidly coupleable to the near-vacuum of outer space via the diverter valve, wherein during compaction the diverter valve fluidly couples the second portion of the drive chamber to the near-vacuum of outer space, and wherein after compaction the diverter valve directs gas from the waste gas source into the second portion of the drive chamber via the second conduit to retract the compaction piston portion of the connector arm;
the compaction piston portion of the connector arm is configured to move within the compaction chamber to compact waste material contained within the compaction chamber in response to movement of the drive piston portion of the connector arm within the drive chamber;

in response to compacting the waste material contained within the compaction chamber, the compaction chamber is configured to expel a waste fluid via the fluid outlet to the gas-liquid separator; and the gas-liquid separator is configured to separate the waste fluid into waste liquid and waste gas.

13. The system of claim 12, wherein the diverter valve is selectively operable to control a drive pressure in the drive chamber, and wherein during compaction the diverter valve directs gas from the waste gas source into the first portion of the drive chamber via the first conduit.

14. The system of claim 13, further comprising:

a waste gas conduit configured to receive the waste gas from the gas-liquid separator; and a waste gas valve fluidly coupled to the waste gas conduit, wherein the waste gas valve is configured to actuate between a first position wherein the waste gas is directed to outer space and a second position wherein the waste gas is directed to the waste gas source.

\* \* \* \* \*